US007383120B2

(12) United States Patent
Stockbridge et al.

(10) Patent No.: US 7,383,120 B2
(45) Date of Patent: Jun. 3, 2008

(54) METHODS AND APPARATUS FOR ADJUSTING FREQUENCY AND/OR PWM-BASED SENSORS

(75) Inventors: John N. Stockbridge, Novi, MI (US); Kerfegar K. Katrak, Fenton, MI (US); Paul A. Bauerle, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 755 days.

(21) Appl. No.: 10/895,640

(22) Filed: Jul. 21, 2004

(65) Prior Publication Data

US 2005/0027405 A1 Feb. 3, 2005

Related U.S. Application Data

(60) Provisional application No. 60/491,903, filed on Aug. 1, 2003, provisional application No. 60/491,700, filed on Aug. 1, 2003, provisional application No. 60/491,905, filed on Aug. 1, 2003.

(51) Int. Cl.
*G06F 17/00* (2006.01)

(52) U.S. Cl. ...................... 701/115; 340/453; 701/102; 701/1; 702/127

(58) Field of Classification Search .................... 701/1, 701/115; 340/453; 702/127
See application file for complete search history.

(56) References Cited

U.S. PATENT DOCUMENTS 5,266,938 A * 11/1993 Mogi et al. ................. 345/204
5,333,846 A * 8/1994 Goto et al. ............ 267/140.14
5,334,932 A * 8/1994 Nielsen ...................... 324/204
5,427,347 A * 6/1995 Swanson et al. ....... 267/140.14
5,647,579 A * 7/1997 Satoh .................... 267/140.14

(Continued)

FOREIGN PATENT DOCUMENTS

EP 449543 A1 * 10/1991

(Continued)

OTHER PUBLICATIONS

Development of computer-based measurements and their application to PD pattern analysis, James, R.E.; Phung, B.T.; Dielectrics and Electrical Insulation, IEEE Transactions on [see also Electrical Insulation, IEEE Transactions on] vol. 2, Issue 5, Oct. 1995 pp. 838-856, Digital Object Identifier 10.1109/94.469978.*

(Continued)

*Primary Examiner*—Cuong Nguyen

(57) ABSTRACT

A sensor module adjustment circuit includes a device have a position between minimum and maximum positions. First and second position sensors sense the position of the device and generate first and second position values, respectively. A sensor module includes first and second signal conversion modules that generate first and second signal waveforms based on the first and second position values, that include first and second gain modules, and that vary a frequency and a duty cycle, respectively, of the first and second signal waveforms based on the first and second position values. A gain magnitude module determines first and second signal gains of the first and second gain modules, respectively. A signal preset module adjusts the first and second signal gains so that the first and second signal waveforms are equal to first and second predetermined signal waveforms, respectively, when the position of the device is fixed.

23 Claims, 6 Drawing Sheets

U.S. PATENT DOCUMENTS

| | | | | |
|---|---|---|---|---|
| 5,718,417 A * | 2/1998 | Aoki | ..................... | 267/140.14 |
| 5,767,670 A * | 6/1998 | Maher et al. | .......... | 324/207.12 |
| 5,779,231 A * | 7/1998 | Okazaki et al. | ........ | 267/140.14 |
| 5,905,317 A * | 5/1999 | Aoki | ..................... | 267/140.14 |
| 5,947,456 A * | 9/1999 | Aoki | ..................... | 267/140.14 |
| 6,010,120 A * | 1/2000 | Nagasawa | .............. | 267/140.14 |
| 6,017,024 A * | 1/2000 | Muramatsu et al. | ... | 267/140.14 |
| 6,254,069 B1 * | 7/2001 | Muramatsu et al. | ... | 267/140.14 |
| 2005/0027405 A1 * | 2/2005 | Stockbridge et al. | .......... | 701/1 |

FOREIGN PATENT DOCUMENTS

| | | |
|---|---|---|
| JP | 06284778 A * | 10/1994 |
| JP | 2004161118 A * | 6/2004 |
| KR | 637674 B1 * | 10/2006 |

OTHER PUBLICATIONS

5th Annual Magnetic Recording Conference (TMRC) on Signal Processing, Magnetics, IEEE Transactions on□□vol. 31, Issue 2, Mar. 1995, Digital Object Identifier 10.1109/20.364762.*

Self-calibration/compensation technique for microcontroller-based sensor arrays, Kolen, P.T.; Instrumention and Measurement, IEEE Transactions on, vol. 43, Issue 4, Aug. 1994 pp. 620-623, Digital Object Identifier 10.1109/19.310177.*

Autonomous control reconfiguration, Rauch, H.E.; Control Systems Magazine, IEEE, vol. 15, Issue 6, Dec. 1995 pp. 37-48, Digital Object Identifier 10.1109/37.476385.*

Thermoacoustic instability: model-based optimal control designs and experimental validation, Annaswamy, A.M.; Fleifil, M.; Rumsey, J.W.; Prasanth, R.; Hathout, J.-P.; Ghoniem, A.F.; Control Systems Technology, IEEE Transactions on, vol. 8, Issue 6, Nov. 2000 pp. 905-918, Digital Object Identifier 10.1109/87.880593.*

Integrated photo and acceleration sensing module for robot planning and contro, Salam, F.M.; Xi, N.; Robotics and Automation, 1999. Proceedings. 1999 IEEE International Conference on, vol. 2, May 10-15, 1999 pp. 1293-1298 vol. 2 Digital Object Identifier 10.1109/ROBOT.1999.772539.*

Systematic control of a class of nonlinear systems with application to electrohydraulic cylinder pressure control, Alleyne, A.G.; Rui Liu; Control Systems Technology, IEEE Transactions on, vol. 8, Issue 4, Jul. 2000 pp. 623-634, Digital Object Identifier 10.1109/87.852908.*

* cited by examiner

METHODS AND APPARATUS FOR ADJUSTING FREQUENCY AND/OR PWM-BASED SENSORS

CROSS-REFERENCE TO RELATED APPLICATIONS

This application claims the benefit of U.S. Provisional Application No. 60/491,903, filed on Aug. 1, 2003, 60/491,700, filed on Aug. 1, 2003, and 60/491,905, filed on Aug. 1, 2003, which are hereby incorporated by reference in their entirety.

FIELD OF THE INVENTION

The present invention relates to vehicle control systems, and more particularly to sensor modules for redundant position sensing of devices in vehicle control systems.

BACKGROUND OF THE INVENTION

Vehicle manufacturers are increasingly replacing mechanical linkages in vehicles with sensors and electromechanical devices to reduce weight and cost. For example, sensors are replacing mechanical linkages to detect positions of user operated devices such as accelerator, clutch, and brake pedals. Signals are transmitted from the sensors to controllers and/or electromechanical devices in the vehicle. For example, a signal from an accelerator pedal may be transmitted to an actuator in the electronic throttle body to adjust the position of the throttle blade. Additionally, a throttle position sensor detects the position of the throttle blade and transmits a signal to an engine control module.

In cases where mechanical linkages are at least partially eliminated, multiple sensors are commonly used to perform redundant measurements and ensure system accuracy. For example, some manufacturers use analog position sensors that are based on a resistive ink or paste that is deposited on a non-conducting substrate. Other manufacturers use application specific integrated circuits (ASICs) in combination with sensors. The sensors typically include hall effect or inductively coupled sensors. The ASICs receive analog signals from the sensors and output pulse width modulated (PWM) or other types of signals. Any of these sensors may use one or multiple shared reference voltages. However, as the number of sensors increases, the number of wires and overall cost increases.

SUMMARY OF THE INVENTION

A sensor module adjustment circuit according to the present invention includes a device having a position between minimum and maximum positions. First and second position sensors sense the position of the device and generate first and second position values, respectively. A sensor module includes a first signal conversion module that generates a first signal waveform based on the first position value, that varies a frequency of the first signal waveform based on the first position value, and that includes a first gain module. A second signal conversion module generates a second signal waveform based on the second position value, varies a duty cycle of the second signal waveform based on the second position value, and includes a second gain module. A gain magnitude module communicates with the first and second gain modules and determines first and second signal gains of the first and second gain modules, respectively. A signal preset module communicates with the gain magnitude module and adjusts the first and second signal gains so that the first and second signal waveforms are equal to first and second predetermined signal waveforms, respectively, when the position of the device is fixed.

In other features, the sensor module further includes a signal combiner that communicates with the first and second signal conversion modules, that receives the first and second signal waveforms, and that generates a single signal waveform based on the first and second signal waveforms. A frequency of the single signal waveform corresponds with the frequency of the first signal waveform and a duty cycle of the single signal waveform corresponds with the duty cycle of the second signal waveform. A system comprises the sensor module adjustment circuit and a conductor having a first end that communicates with the signal combiner and a second end. A control module communicates with the second end of the conductor. The signal combiner transmits the single signal waveform to the control module on the conductor and the control module decodes the single signal waveform to determine the first and second position values.

In still other features of the invention, the control module scales the first and second position values between position values that correspond to the first and second predetermined signal waveforms and a position value that is learned during normal operations to determine the position of the device. The control module converts the position of the device into a normalized value that represents a fraction of a range between the minimum and maximum positions of the device. The device is a throttle blade of a vehicle. The control module determines the normalized value based on a measured position value, position values that correspond to the first and second predetermined signal waveforms, a learned minimum position value, a maximum airflow position value, a breakout position value, and/or a breakout displacement value.

In yet other features, a system comprises the sensor module adjustment circuit and a first conductor having a first end that communicates with the first signal conversion module and a second end. A second conductor has a first end that communicates with the second signal conversion module and a second end. A control module communicates with the second ends of the first and second conductors. The first and second signal conversion modules transmit the first and second signal waveforms, respectively, to the control module on the first and second conductors. The control module decodes the first and second signal waveforms to determine the first and second position values. The control module scales the first and second position values between position values that correspond to the first and second predetermined signal waveforms and a position value that is learned during normal operations to determine the position of the device.

In still other features of the invention, the control module converts the position of the device into a normalized value that represents a fraction of a range between the minimum and maximum positions of the device. The device is a throttle blade of a vehicle. The control module determines the normalized value based on a measured position value, position values that correspond to the first and second predetermined signal waveforms, a learned minimum position value, a maximum airflow position value, a breakout position value, and/or a breakout displacement value.

In yet other features, the device is a throttle blade of a vehicle. The position of the throttle blade is fixed at one of a maximum airflow position, a breakout position, a minimum stop throttle position, or a default throttle position while the signal preset module adjusts the first and second signal gains. The gain adjustment module includes trim resistors. A resistance of the trim resistors determines the first and second signal gains. The signal preset module is a resistor trimming module that adjusts the resistance. The device is one of an accelerator pedal, a brake pedal, a clutch pedal, or a throttle blade of a vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
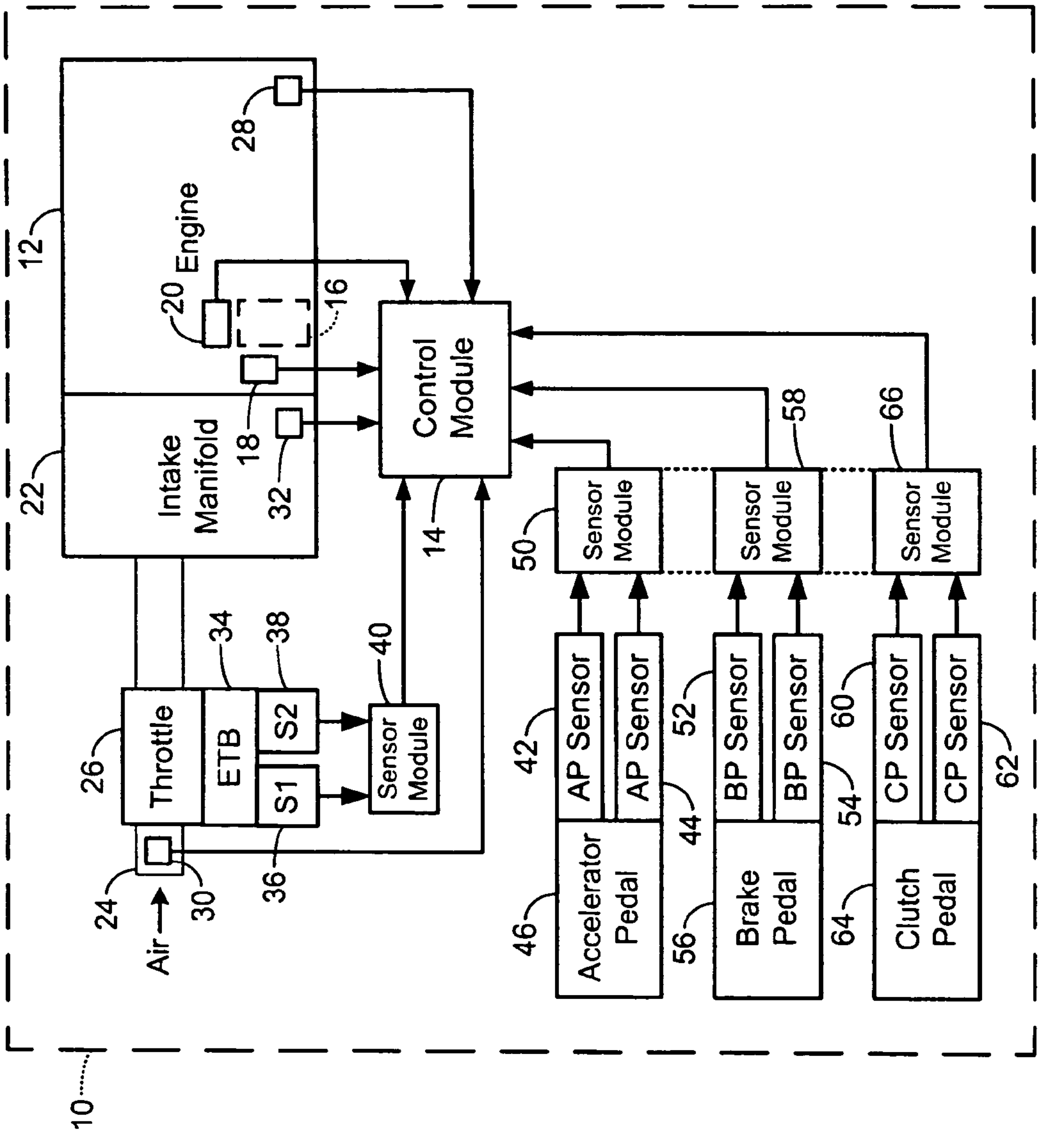
FIG. 1 is a functional block diagram of a vehicle control system including a control module that receives signals from vehicle sensors according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, a micro-controller with timer I/O, and/or other suitable components that provide the described functionality.

Referring to FIG. 1, a vehicle 10 includes an engine 12 and a control module 14. The engine 12 includes a cylinder 16 that has a fuel injector 18 and a spark plug 20. Although a single cylinder 16 is shown, those skilled in the art can appreciate that the engine 12 typically includes multiple cylinders 16 with associated fuel injectors 18 and spark plugs 20. For example, the engine 12 may include 4, 5, 6, 8, 10, 12, or 16 cylinders 16.

Air is drawn into an intake manifold 22 of the engine 12 through an inlet 24. A throttle blade 26 regulates air flow through the inlet 24. Fuel and air are combined in the cylinder 16 and are ignited by the spark plug 20. The throttle blade 26 controls the rate that air flows into the intake manifold 22. The control module 14 adjusts the rate that fuel is injected into the cylinder 16 based on the air that is flowing into the cylinder 16 to control the air/fuel (A/F) ratio within the cylinder 16. The control module 14 communicates with an engine speed sensor 28 that generates an engine speed signal. The control module 14 also communicates with mass air flow (MAF) and manifold absolute pressure (MAP) sensors 30 and 32, which generate MAF and MAP signals, respectively.

The engine 12 includes an electronic throttle body (ETB) 34 that is associated with the throttle blade 26. The ETB 34 is controlled by the control module 14 and/or a dedicated controller such as an electronic throttle controller (ETC). First and second throttle position sensors 36 and 38, respectively, detect a position of the throttle blade 26 in the ETB 34 and generate first and second position signals that represent the position of the throttle blade 26. The first and second position signals are received by a sensor module 40. For example, the sensor module 40 may be an application specific integrated circuit (ASIC). The sensor module 40 transmits a signal to the control module 14 that is pulse width modulated (PWM) and that has a variable frequency as will be described in further detail below.

The vehicle 10 optionally includes first and second accelerator pedal (AP) position sensors 42 and 44, respectively, that detect a position of the AP 46. The first and second AP position sensors, 42 and 44, respectively, generate first and second position signals that represent the position of the AP 46. A sensor module 50 receives the first and second position signals and transmits a PWM signal to the control module 14 that also has a variable frequency.

The vehicle 10 optionally includes first and second brake pedal (BP) position sensors 52 and 54, respectively, that detect a position of the BP 56. The first and second BP position sensors 52 and 54, respectively, generate first and second position signals that represent the position of the BP 56. A sensor module 58 receives the first and second position signals and transmits a PWM signal to the control module 14 that also has a variable frequency.

In the case of a manual transmission, the vehicle 10 optionally includes first and second clutch pedal (CP) position sensors 60 and 62, respectively, that detect a position of the CP 64. The first and second CP position sensors 60 and 62, respectively, generate first and second position signals that represent the position of the CP 64. A sensor module 66 receives the first and second position signals and transmits a PWM signal to the control module 14 that also has a variable frequency. Those skilled in the art can appreciate that sensors other than those shown in FIG. 1 may be employed.

The sensor modules 40, 50, 58, and 66 generate respective PWM signals based on respective first and second position signals. The PWM signals include a single signal waveform that indicates values of both the first and second position signals. In an exemplary embodiment, a variable frequency of a PWM signal corresponds to a value of a first position signal, and a variable duty cycle of the PWM signal corresponds to a value of a second position signal. Those skilled in the art can appreciate that any of the sensor modules 40, 50, 58, and/or 66 may receive position signals from more than two position sensors for added redundancy.

It is possible to utilize only the first throttle position sensor 36 and still obtain redundant measurements of the position of the throttle blade 26. For example, other sensors such as the MAF and MAP sensors 30 and 32, respectively, indicate a flow rate and/or a pressure of the air in the intake manifold 22 that may be used to determine a position of the throttle blade 26. In this case, the sensor module 40 generates a signal that includes one of a variable frequency and a variable duty cycle that is based on a value of the first position signal from the first throttle position sensor 36. However, it is difficult to accurately compare the position of the throttle blade 26 from the first throttle position sensor 36 and from the MAF and/or MAP sensors 30 and 32, respectively, in both static and dynamic vehicle conditions.

The control module 14 decodes the PWM signals to determine position values of respective first and second position signals. The control module 14 converts the position values into normalized values that represent a fraction of a range between minimum and maximum positions. For example, a normalized position value for the throttle blade 26 may represent a fraction of the range between an idle throttle position and a wide open throttle (WOT) position.

In this case, a normalized position value of 0% may correspond with the idle throttle position and a normalized position value of 100% may correspond with the WOT position. Therefore, the sensor modules 40, 50, 58, and 60 are preset to output predetermined PWM signals when positions of their respective vehicle devices 26, 46, 56, and 64 are fixed. For example, sensor module 40 may be preset to output a predetermined signal waveform when the throttle blade 26 is fixed at a maximum airflow throttle position. After the sensor module 40 is preset, the control module 14 may scale decoded position values between the preset position value and a position value that is learned during normal operations to determine a position of the throttle blade 26.

Figure 2:
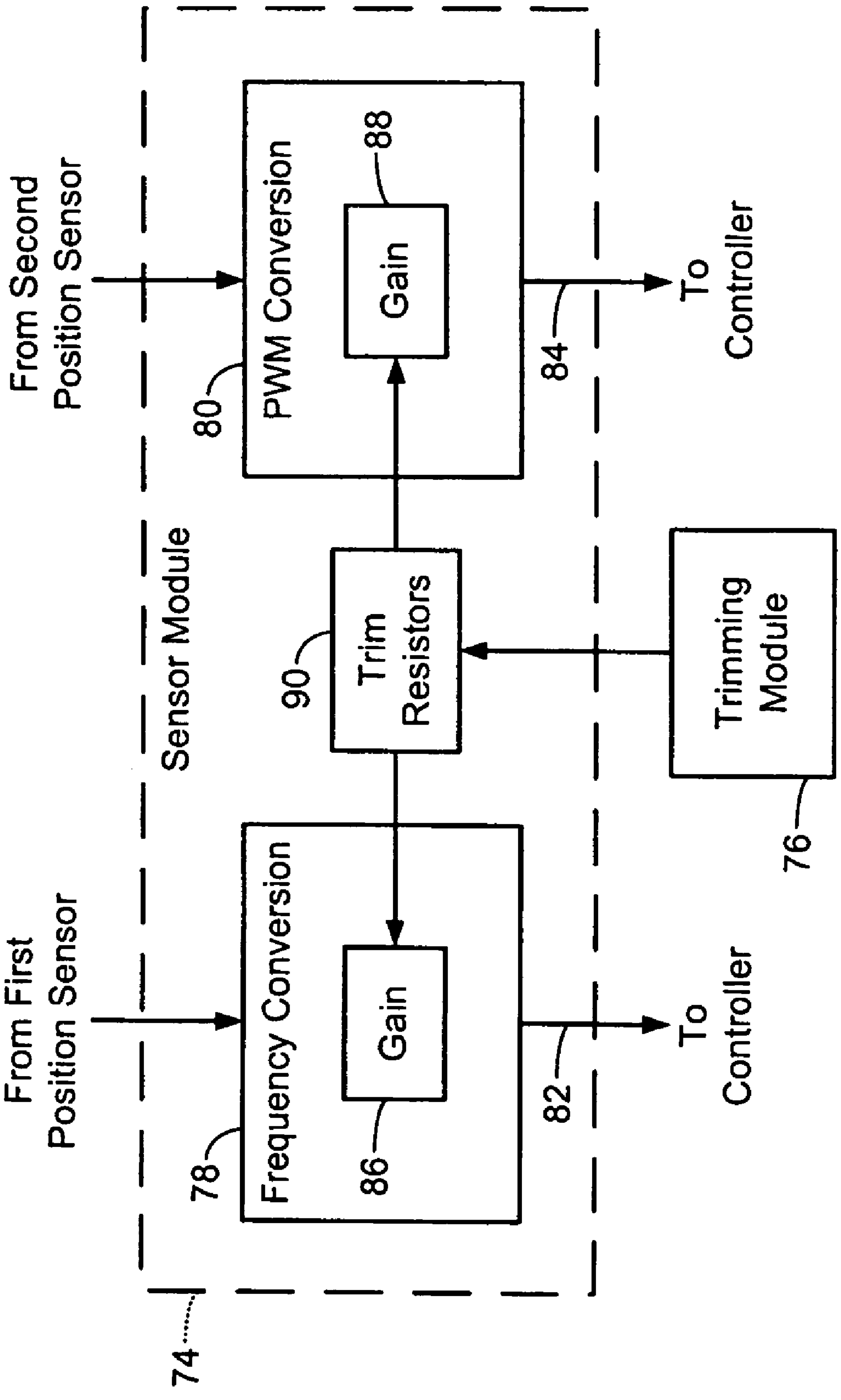
FIG. 2 is a functional block diagram of a sensor module adjustment circuit including a sensor module that converts first and second position values into variable frequency and variable duty cycle signal waveforms.

Referring now to FIG. 2, a sensor module adjustment circuit 74 includes the sensor module 40 and a signal preset module 76. An exemplary embodiment of the present invention is outlined below with respect to position sensing of the throttle blade 26. However, analogous operation of the sensor module adjustment circuit 74 is contemplated with respect to position sensing of other vehicle devices including the accelerator pedal 46, brake pedal 56, and clutch pedal 64.

The sensor module 40 includes a frequency signal conversion module 78 and a pulse width modulated (PWM) signal conversion module 80. An input of the frequency signal conversion module 78 receives the first position signal from the first throttle position sensor 36. The frequency signal conversion module 78 generates a first signal waveform 82 based on the first position signal. The frequency signal conversion module 78 also varies a frequency of the first signal waveform 82 based on the value of the first position signal.

An input of the PWM signal conversion module 80 receives the second position signal from the second throttle position sensor 38. The PWM signal conversion module 80 generates a second signal waveform 84 based on the second position signal. The PWM signal conversion module 80 also varies a duty cycle of the second signal waveform 84 based on the value of the second position signal. The frequency and PWM signal conversion modules 78 and 80 include first and second gain modules 86 and 88, respectively.

Magnitudes of the first and second signal waveforms 82 and 84 are based on signal gains of the first and second gain modules 86 and 88, respectively. For example, a frequency of the first signal waveform 82 may lower when the signal gain of the first gain module 86 is lowered and while the value of the first position signal remains constant. This allows the outputs of the frequency and PWM signal conversion modules 78 and 80, respectively, to be preset when a position of the throttle blade 26 is fixed.

A gain magnitude module 90 communicates with the first and second gain modules 86 and 88, respectively, and determines the signal gains of the first and second gain modules 86 and 88. For example, the gain magnitude module 90 may include trim resistors. In this case, a resistance of the trim resistors may be adjusted to adjust the signal gains. A single set of trim resistors in the gain magnitude module 90 may determine the signal gains of the first and second gain modules 86 and 88, respectively.

Alternatively, the gain magnitude module 90 may include separate sets of trim resistors for the first and second gain modules 86 and 88, respectively. The signal preset module 76 communicates with the gain magnitude module 90 and adjusts the signal gains. For example, the signal preset module 76 may be a resistor trimming module that adjusts a resistance of the gain magnitude module 90 to adjust the signal gains. In an exemplary embodiment, the signal preset module 76 employs laser ablation techniques to adjust the resistance of trim resistors in the gain magnitude module 90.

Figure 3:
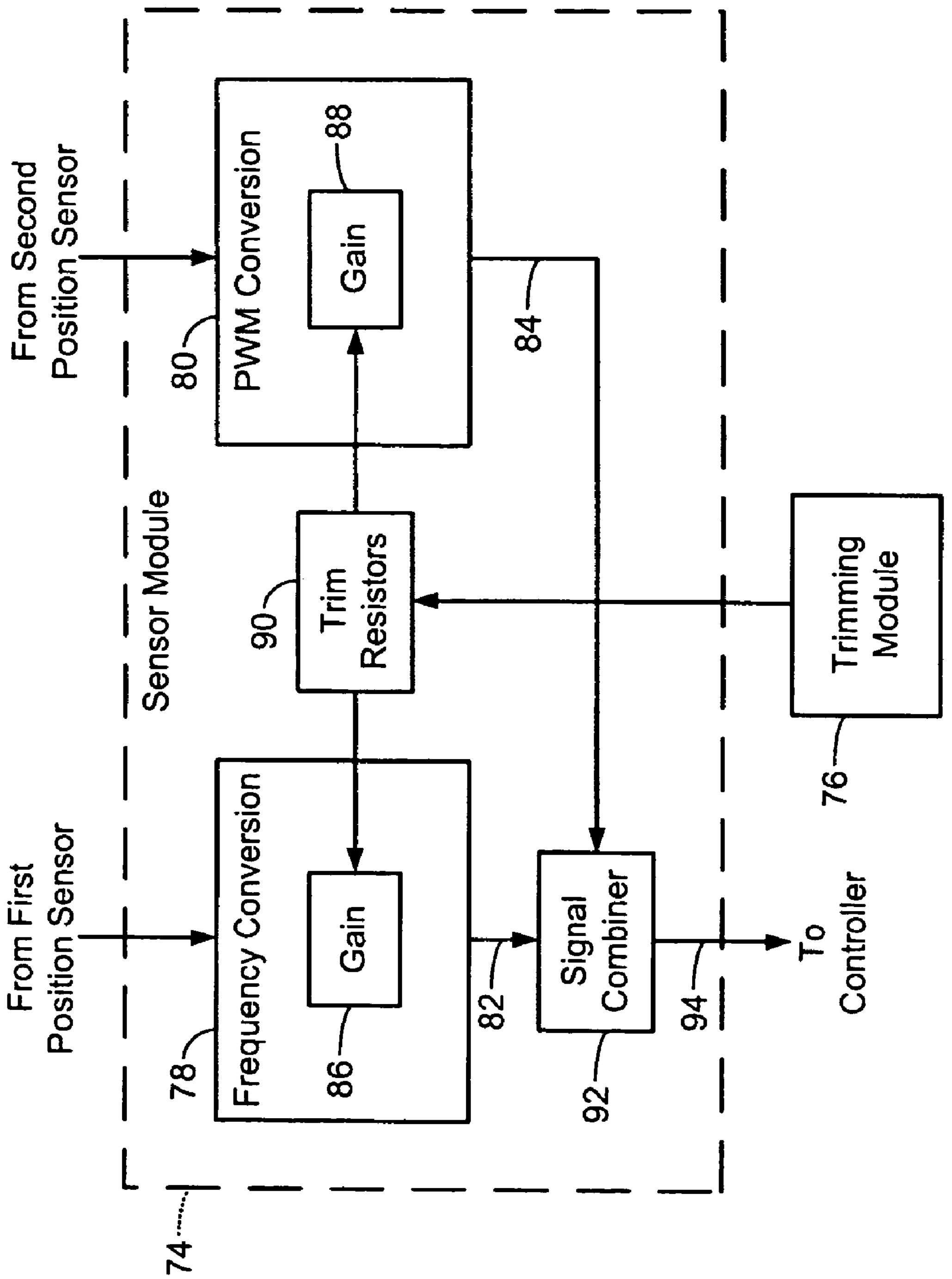
FIG. 3 is a functional block diagram of a sensor module adjustment circuit including a sensor module that converts first and second position values into a single signal waveform.

Referring now to FIG. 3, the sensor module 40 further includes a signal combiner 92 that communicates with the frequency and PWM signal conversion modules 78 and 80, respectively. The signal combiner 92 generates a single signal waveform 94 based on the first and second signal waveforms 82 and 84, respectively. This allows the sensor module 40 to transmit values of both the first and second position signals to the control module 14 on a single conductor.

The signal combiner 92 varies a frequency of the single signal waveform 94 based on the value of the first position signal and varies a duty cycle of the single signal waveform 94 based on the value of the second position signal. The sensor module 40 is preset before normal operations by first fixing a position of the throttle blade 26. For example, the position of the throttle blade 26 may be set to one of a maximum airflow position, a breakout position, a minimum stop throttle position, or a default throttle position during a preset operation.

The signal preset module 76 then adjusts the signal gains of the first and second gain modules 86 and 88, respectively, until the first and second signal waveforms 82 and 84, respectively, are equal to first and second predetermined signal waveforms for the embodiment illustrated in FIG. 2. The signal preset module 76 adjusts the signal gains until the single signal waveform 94 is equal to a predetermined signal waveform for the embodiment illustrated in FIG. 3.

The control module 14 scales measured position values between position values that corresponds with predetermined signal waveforms and a position value that is learned during normal operations to determine the position of the throttle blade 26. For example, the sensor module 40 may be preset while the throttle blade 26 is fixed in a maximum airflow position. In this case, the control module 14 may scale a measured position value between the maximum airflow position and a minimum position value that is learned during normal operations to determine the position of the throttle blade 26. Therefore, the control module 14 does not have to determine upper and lower constraints on position values before or during normal operations.

When a maximum airflow position preset is used, the control module 14 may convert the measured position value into a normalized position value based on the preset position value, the measured position value, and the learned position value. When a breakout position preset is used, the control module 14 may convert the measured position value into a normalized position value based on the preset position value, the measured position value, the learned position value, and the displacement of the throttle blade 26 at the preset value. For example, the learned position value may be at a maximum airflow position when the breakout position preset is used.

Figure 4:
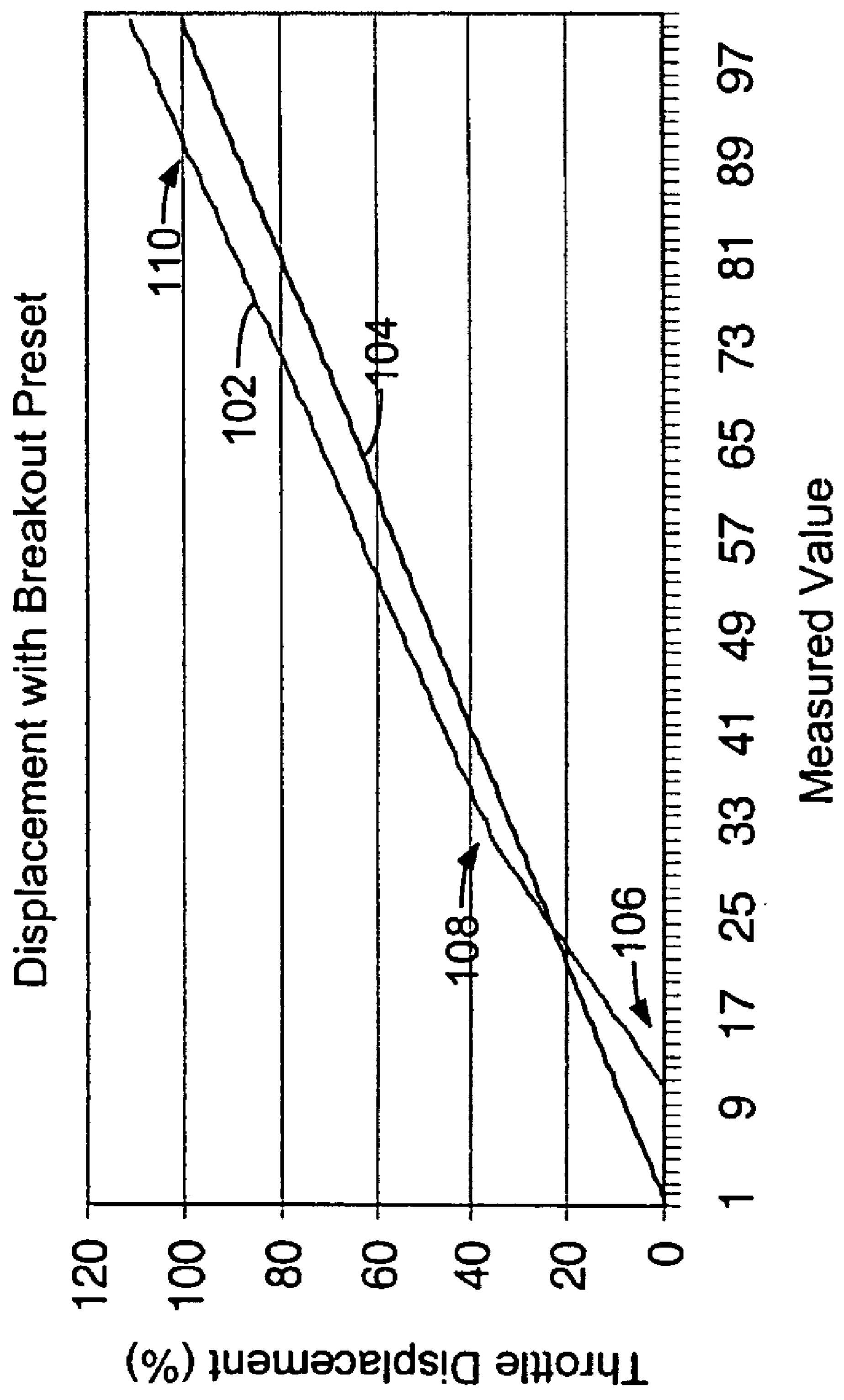
FIG. 4 is a graph showing throttle displacement percentage as a function of measured throttle position when the sensor module is preset with the throttle blade in a breakout position.

Referring now to FIG. 4, the sensor module 40 is preset while the throttle blade 26 is fixed in a breakout throttle position. A displacement function, indicated by 102, indicates displacement percentages of the throttle blade 26 between the minimum and maximum positions based on measured position values. An ideal function, illustrated at 104, illustrates displacement percentages between 0% and 100% that are directly proportional to measured position values between 0 and 100.

To ensure that the measured position values remain between 0 and 100 during normal operations, the range of possible measured position values is preferably set beyond a range of motion of the throttle blade 26. Therefore, the displacement and ideal functions 102 and 104, respectively, illustrated in FIG. 4 are neither parallel nor collinear. In FIG. 4, measured position values for the throttle blade 26 range from a minimum of 10 to a maximum of 90. The measured position value is equal to 30 while the throttle blade 26 is in the breakout throttle position.

The breakout throttle position also corresponds to a throttle displacement percentage of 35%. Therefore, the displacement function 102 begins at a point defined by a measured position value that is equal to 10 and a displacement percentage that is equal to 0%, indicated at 106. The displacement function 102 continues in an approximately linear path and at a first slope to the measured position value and displacement percentage value at the breakout throttle position, indicated at 108. The displacement function 102 then continues in an approximately linear path and at a second slope to a point defined by a measured position value that is equal to 90 and a displacement percentage that is equal to 100%, indicated at 110.

Figure 5:
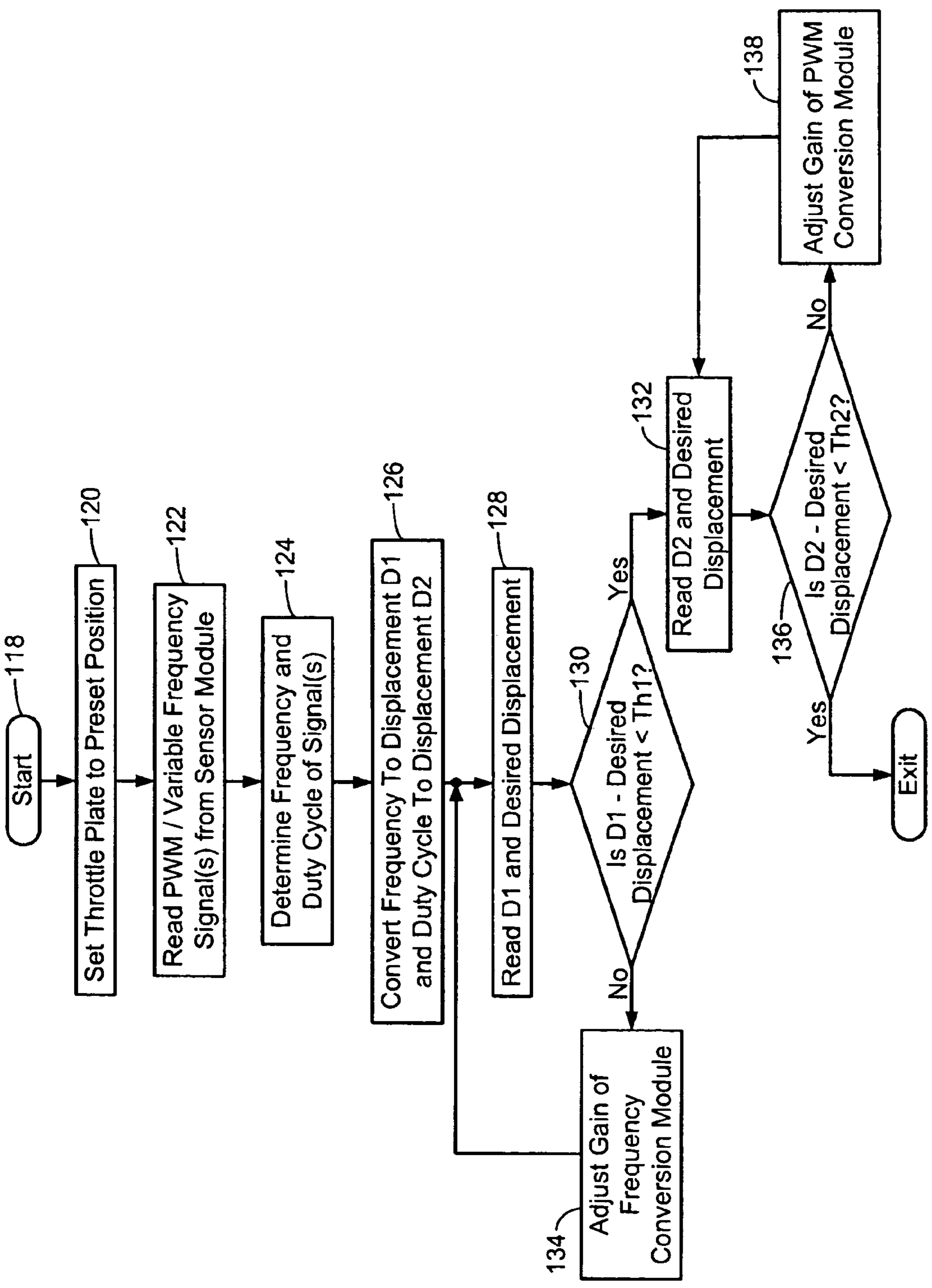
FIG. 5 is a flowchart illustrating steps performed by the sensor module and the control module during a sensor module preset operation.

Referring now to FIG. 5, a sensor module adjustment algorithm begins in step 118. In step 120, the throttle plate is fixed at a predetermined position. In step 122, control reads the first and second signal waveforms 82 and 84, respectively, or the single signal waveform 94 from the sensor module 40. In step 124, control determines the frequency of the first signal waveform 82 and the duty cycle of the second signal waveform 84, or the frequency and the duty cycle of the single signal waveform 94. In step 126, control converts the frequency to displacement D1 and the duty cycle to displacement D2.

In step 128, control reads D1 and a first desired displacement. In step 130, control determines whether the difference between D1 and the first desired displacement is less than a first predetermined value. If true, control proceeds to step 132. If false, control proceeds to step 134. In step 134, the signal preset module 76 adjusts the signal gain of the first gain module 86 and control returns to step 128. In step 132, control reads D2 and a second desired displacement. In step 136, control determines whether a difference between D2 and the second desired displacement is less than a second predetermined value. If true, control ends. If false, control proceeds to step 138. In step 138, the signal preset module 76 adjusts the signal gain of the second gain module 88 and control returns to step 132.

Figure 6:
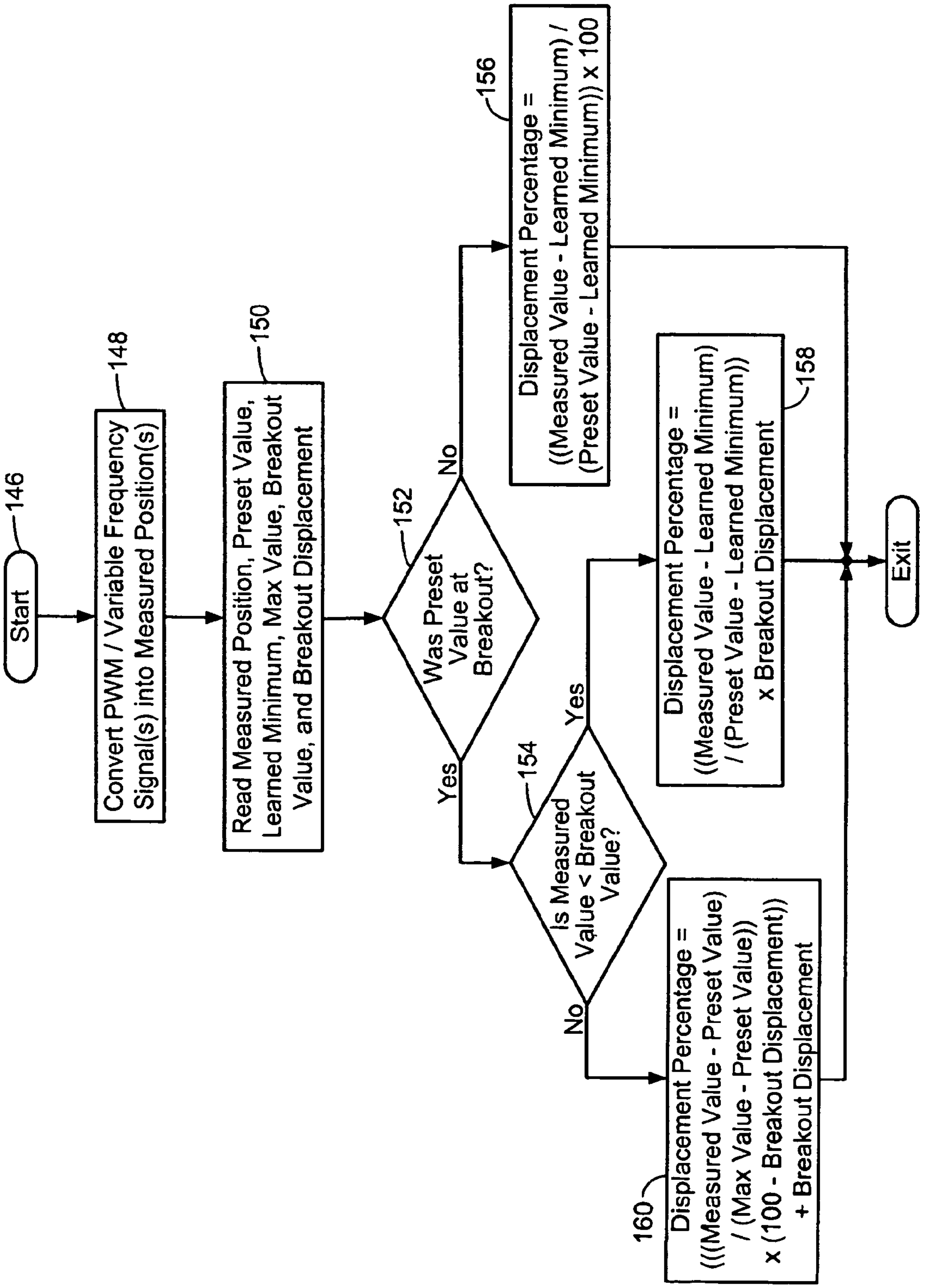
FIG. 6 is a flowchart illustrating steps performed by the control module to convert position values into throttle displacement percentages.

Referring now to FIG. 6, a displacement percentage algorithm begins in step 146. In step 148, the control module 14 converts the first and second signal waveforms 82 and 84, respectively, or the single signal waveform 94 into measured position values. In step 150, control reads a measured position value, a preset position value, a learned minimum position value, a maximum position value, a breakout position value, and a breakout displacement percentage. In step 152, control determines whether the sensor module 40 was preset while the throttle blade 26 was fixed in a breakout position. If true, control proceeds to step 154. If false, control proceeds to step 156. In step 154, control determines whether the measured position value is less than the breakout position value. If true, control proceeds to step 158. If false control proceeds to step 160.

In step 160, control computes the normalized displacement value by first dividing the difference between the measured position value and the preset position value by the difference between the maximum position value and the preset position value. The quotient is then multiplied by the difference between 100 and the breakout displacement percentage. Finally, the product is summed with the breakout displacement percentage and control ends. In step 158, control computes the normalized position value by first dividing the difference between the measured position value and the learned minimum position value by the difference between the preset position value and the learned minimum position value.

The quotient is then multiplied by the breakout displacement percentage and control ends. In step 156, control computes the normalized position value by first dividing the difference between the measured position value and the learned minimum position value by the difference between the preset position value and the learned minimum position value. The quotient is then multiplied by 100 and control ends.

The sensor module adjustment circuit 74 of the present invention allows for accurate redundant position sensing of vehicle devices. By presetting the sensor module 40 when a position of a device is fixed, an accurate measure of the position of the device is obtained. Inaccuracies of position sensors are avoided by scaling the measured position values between preset position values and position values that are learned during normal operations. Therefore, the measured position values correspond more closely with the actual position of the device in the vehicle. Additionally, space usage and cost is decreased by utilizing a single conductor to transmit dual position indication signals.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A sensor module adjustment circuit, comprising:

a device having a position between minimum and maximum positions;

first and second position sensors that sense said position of said device and that generate first and second position values, respectively;

a sensor module that includes:

a first signal conversion module that generates a first signal waveform based on said first position value, that varies a frequency of said first signal waveform based on said first position value, and that includes a first gain module;

a second signal conversion module that generates a second signal waveform based on said second position value, that varies a duty cycle of said second signal waveform based on said second position value, and that includes a second gain module; and a gain magnitude module that communicates with said first and second gain modules and that determines first and second signal gains of said first and second gain modules, respectively; and a signal preset module that communicates with said gain magnitude module and that adjusts said first and second signal gains so that said first and second signal waveforms are equal to first and second predetermined signal waveforms, respectively, when said position of said device is fixed.

2. The sensor module adjustment circuit of claim 1 wherein said sensor module further includes a signal combiner that communicates with said first and second signal conversion modules, that receives said first and second signal waveforms, and that generates a single signal waveform based on said first and second signal waveforms.

3. The sensor module adjustment circuit of claim 2 wherein a frequency of said single signal waveform corresponds with said frequency of said first signal waveform and a duty cycle of said single signal waveform corresponds with said duty cycle of said second signal waveform.

4. The sensor module adjustment circuit of claim 1 wherein said device is a throttle blade of a vehicle and wherein said position of said throttle blade is fixed at one of a maximum airflow position, a breakout position, a minimum stop throttle position, or a default throttle position while said signal preset module adjusts said first and second signal gains.

5. The sensor module adjustment circuit of claim 1 wherein said device is one of an accelerator pedal, a brake pedal, a clutch pedal, or a throttle blade of a vehicle.

6. The sensor module adjustment circuit of claim 1 wherein said gain adjustment module includes trim resistors and wherein a resistance of said trim resistors determines said first and second signal gains.

7. The sensor module adjustment circuit of claim 6 wherein said signal preset module is a resistor trimming module that adjusts said resistance.

8. A sensor module adjustment circuit for a vehicle control system, comprising:

a vehicle device having a position between minimum and maximum positions, wherein said vehicle device is one of an accelerator pedal, a brake pedal, a clutch pedal, or a throttle blade of a vehicle;

first and second position sensors that sense said position of said device and that generate first and second position values, respectively;

a sensor module that includes:

a first signal conversion module that generates a first signal waveform based on said first position value, that varies a frequency of said first signal waveform based on said first position value, and that includes a first gain module;

a second signal conversion module that generates a second signal waveform based on said second position value, that varies a duty cycle of said second signal waveform based on said second position value, and that includes a second gain module; and a gain magnitude module that communicates with said first and second gain modules and that determines first and second signal gains of said first and second gain modules, respectively; and a signal preset module that communicates with said gain magnitude module and that adjusts said first and second signal gains so that said first and second signal waveforms are equal to first and second predetermined signal waveforms, respectively, when said position of said vehicle device is fixed.

9. A method for adjusting a sensor module, comprising:

sensing a position of a device with a first position sensor, wherein said position of said device is between minimum and maximum positions and wherein said first position sensor generates a first position value;

sensing said position of said device with a second position sensor, wherein said second position sensor generates a second position value;

generating a first signal waveform with a first signal conversion module based on said first position value;

varying a frequency of said first signal waveform based on said first position value;

generating a second signal waveform with a second signal conversion module based on said second position value;

varying a duty cycle of said second signal waveform based on said second position value;

adjusting a first signal gain of a first gain module in said first signal conversion module and a second signal gain of a second gain module in said second signal conversion module so that said first and second signal waveforms are equal to first and second predetermined signal waveforms, respectively, when said position of said device is fixed.

10. The method of claim 9 further comprising generating a single signal waveform based on said first and second signal waveforms.

11. The method of claim 10 wherein a frequency of said single signal waveform corresponds with said frequency of said first signal waveform and a duty cycle of said single signal waveform corresponds with said duty cycle of said second signal waveform.

12. The method of claim 10 further comprising:

transmitting said single signal waveform to a control module on a conductor; and decoding said single signal waveform at said control module to determine said first and second position values.

13. The method of claim 12 further comprising scaling said first and second position values between position values that correspond to said first and second predetermined signal waveforms and a position value that is learned during normal operations to determine said position of said device.

14. The method of claim 13 further comprising converting said position of said device into a normalized value that represents a fraction of a range between said minimum and maximum positions of said device.

15. The method of claim 14 wherein said device is a throttle blade of a vehicle and wherein said control module determines said normalized value based on a measured position value, position values that correspond to said first and second predetermined signal waveforms, a learned minimum position value, a maximum airflow position value, a breakout position value, and/or a breakout displacement value.

16. The method of claim 9 further comprising:

transmitting said first signal waveform to a control module on a first conductor;

transmitting said second signal waveform to said control module on a second conductor; and decoding said first and second signal waveforms at said control module to determine said first and second position values.

17. The method of claim 16 further comprising scaling said first and second position values between position values that correspond to said first and second predetermined signal waveforms and a position value that is learned during normal operations to determine said position of said device.

18. The method of claim 17 further comprising converting said position of said device into a normalized value that represents a fraction of a range between said minimum and maximum positions of said device.

19. The method of claim 18 wherein said device is a throttle blade of a vehicle and wherein said control module determines said normalized value based on a measured position value, position values that correspond to said first and second predetermined signal waveforms, a learned minimum position value, a maximum airflow position value, a breakout position value, and/or a breakout displacement value.

20. The method of claim 9 wherein said device is a throttle blade of a vehicle and wherein said position of said throttle blade is fixed at one of a maximum airflow position, a breakout position, a minimum stop throttle position, or a default throttle position while said signal preset module adjusts said first and second signal gains.

21. The method of claim 9 wherein said device is one of an accelerator pedal, a brake pedal, a clutch pedal, or a throttle blade of a vehicle.

22. The method of claim 9 wherein the sensor module includes a gain adjustment module that communicates with the first and second gain modules, said gain adjustment module includes trim resistors, and a resistance of said trim resistors determines said first and second signal gains.

23. The method of claim 22 wherein a resistor trimming module adjusts said resistance.

* * * * *